US008858211B2

(12) United States Patent
Fraley

(10) Patent No.: US 8,858,211 B2
(45) Date of Patent: Oct. 14, 2014

(54) LIQUID COATING DIE

(75) Inventor: Ronald Fraley, Waverly, NY (US)

(73) Assignee: Premier Dies Corporation, Chippewa Falls, WI (US)

( * ) Notice: Subject to any disclaimer, the term of this patent is extended or adjusted under 35 U.S.C. 154(b) by 848 days.

(21) Appl. No.: 13/017,584

(22) Filed: Jan. 31, 2011

(65) Prior Publication Data

US 2012/0196045 A1 Aug. 2, 2012

(51) Int. Cl.

| | |
|---|---|
| ***B29C 47/14*** | (2006.01) |
| ***B05D 7/00*** | (2006.01) |
| ***B05C 5/02*** | (2006.01) |
| ***B05D 1/26*** | (2006.01) |

(52) U.S. Cl.

CPC *B05D 1/265* (2013.01); *B05D 7/52* (2013.01); *B05C 5/0254* (2013.01)

USPC .................. 425/183; 425/192 R; 425/382 R; 425/463

(58) Field of Classification Search

CPC B29C 47/0019; B29C 47/0021; B29C 47/14; B29C 47/30

USPC ................ 425/133.5, 183, 192 R, 382 R, 463

See application file for complete search history.

(56) References Cited

U.S. PATENT DOCUMENTS

| | | | | |
|---|---|---|---|---|
| 3,151,356 | A * | 10/1964 | Senecal | 425/133.5 |
| 3,836,313 | A * | 9/1974 | Stafford | 425/463 |
| 3,874,833 | A | 4/1975 | Ancker | |
| 4,152,387 | A | 5/1979 | Cloeren | |
| 4,756,271 | A | 7/1988 | Maier | |
| 4,780,258 | A | 10/1988 | Cloeren | |
| 5,173,141 | A | 12/1992 | Leseman et al. | |
| 5,256,357 | A * | 10/1993 | Hayward | 264/172.19 |
| 5,733,605 | A | 3/1998 | Akiyama et al. | |
| 5,770,240 | A | 6/1998 | Krupa | |
| 5,851,566 | A | 12/1998 | Potjer et al. | |
| 2006/0090322 | A1 | 5/2006 | Ciliske et al. | |

FOREIGN PATENT DOCUMENTS

| | | |
|---|---|---|
| JP | 11-226469 | 8/1999 |
| JP | 2000-141446 | 5/2000 |
| JP | 2002-136909 | 5/2002 |

* cited by examiner

*Primary Examiner* — Yogendra Gupta
*Assistant Examiner* — Joseph Leyson
(74) *Attorney, Agent, or Firm* — Fredrikson & Byron, P.A.

(57) ABSTRACT

A coating die that includes a removable manifold section with each side of the manifold section defining a manifold, a land, and an outlet or lip. The two manifolds, lands and outlets may be the same or different, respectively. The manifold section is removably connected to at least one die body and can be removed from the die body to switch between the two sides of the manifold section. The coating die is designed and configured for web or substrate coating, either on-roll (supported web) coating or off-roll (tension web) coating.

18 Claims, 5 Drawing Sheets

LIQUID COATING DIE

FIELD

The present invention relates to coating dies or applicator dies for applying a liquid coating material to a moving sheet or web. In particular, the present invention relates to a coating die having a removable and replaceable portion that defines two manifolds, two lands and two outlets.

BACKGROUND

A coating die is used to apply a thin layer of liquid material (e.g., thermoplastic or solvent based) to a support substrate such as a sheet or film. The most common coating process is to provide a continuous layer of coated material on the substrate by having a continuous stream of material applied to the moving substrate.

A coating die includes at least an inlet for receiving the material to be coated, a manifold to distribute the material across the width of the coating die, and an outlet through which the material exits the die. The exact configuration of the die will vary depending on the material being coated, the desired coating properties (i.e., allowable pressure drop, flow rate, etc.), the desired coating width, etc. If a coating line or facility interchangeably runs numerous types of coatings, then the facility needs to have an inventory of different dies. Because a coating die is a very expensive piece of capital equipment, large amounts of money are tied up in the various dies.

Many facilities have at least one back-up coating die for occasions when the die being used gets damaged. Again however, the facility needs to have an inventory of back-up dies.

BRIEF SUMMARY

The present disclosure relates to a coating die that can decrease the inventory of coating dies needed by a facility. In most instances, the coating die of this invention reduces the number of inventory dies by half.

The coating die of this invention includes a removable and replaceable manifold section that includes two coating material paths; that is, the manifold section includes or at least partially defines two manifolds, two lands, and two outlets. While the first coating path is being used for applying a material, the second coating path may be idle; for embodiments where the second coating path is the same as the first coating path, the second coating path is a back-up; for embodiments where the second coating path is different than the first coating path, the second coating path is a second die suitable for use in a different coating application. In some process embodiments, the two coating material paths may be used simultaneously to provide a multiple layer coating. In other process embodiments, while the first coating path is being used for applying a material, the second coating path may be used to affect the first coating, either prior to or after being applied. For example, the second coating path may be used to pull a vacuum to reduce the amount of air bubbles entrained in the material being coated. As another example, the second coating path may be used to impinge air (e.g., as an air knife) into the coating. The two coating paths may be used for additional processes.

In one particular embodiment, this invention is directed to a coating die having a first die body, a second die body, and a manifold section. The manifold section has a first side and an opposite second side, and is removably connected to the first die body and to the second die body. Together, the first die body and the first side of the manifold section define a first manifold configuration and together, the second die body and the second side of the manifold section define a second manifold configuration. Either or both of the manifold configurations may include a manifold, a land, and an outlet. The first manifold configuration may be the same as or different than the second manifold configuration.

In another particular embodiment, this invention is directed to a coating die having a first die body and a manifold section removably connected to the first die body. The manifold section has a first side and an opposite second side, the first side defining a first inlet, a first manifold and a first land and the opposite second side defining a second inlet, a second manifold and a second land. In some embodiments, a second die body may be removably connected to the second side of the manifold section. The first inlet, the first manifold and the first land may be the same as or different than the respective second inlet, second manifold and second land.

In yet another particular embodiment, this invention is directed to a method of coating using a die having a manifold section that is removable and replaceable from between a first die body and a second die body. The first die body and a first side of the manifold section define a first manifold and a first land, and the second die body and a second side of the manifold section define a second manifold and a second land. The manifold section and appropriate die bodies may also define an outlet.

In still another embodiment, this invention is directed to a method of applying a first coating and a second coating. The method includes applying a first coatable material to a substrate via a first fluid channel defined by a first side of a manifold section and a die body, the first side of the manifold section comprising a first inlet, a first manifold and a first land. The method also includes applying a second coatable material to a substrate via a second fluid channel defined by a second side of the manifold section and a second die body, the second side opposite the first side of the manifold section, the second side of the manifold section comprising a second inlet, a second manifold and a second land. The first manifold and the first land may be the same as or different than the second manifold and the second land, respectively. The first coatable material may be the same or different than the second coatable material. For most embodiments wherein the first manifold and first land are the same as the second manifold and the second land, the coatable materials are the same. When different coatable materials are used, the first coatable material may be applied simultaneously as the second coatable material.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
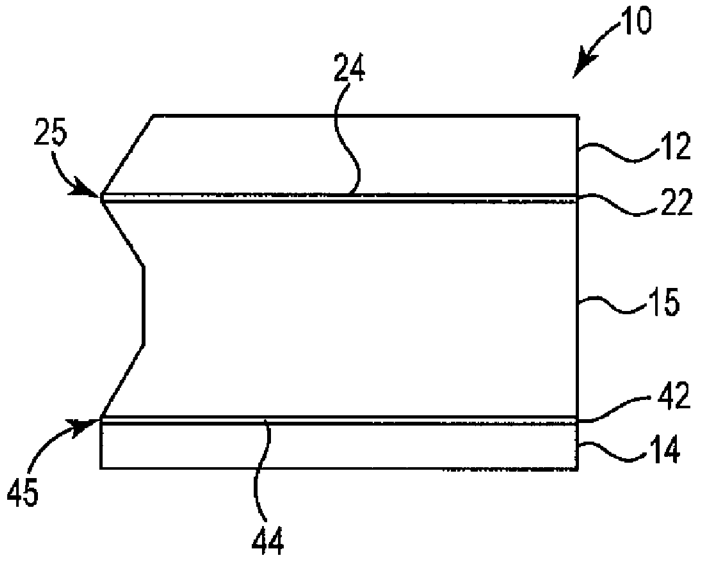
FIG. 1 is a schematic side view of a coating die according to this invention.

In the following description, reference is made to the accompanying set of drawings that form a part hereof and in which are shown by way of illustration at least one specific embodiment. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to coating dies that include a removable manifold section with each side of the manifold section defining a manifold and an outlet or lip; that is, the manifold section includes at least two manifolds, two lands, and two outlets or lips. The manifold section can be removed from the coating die to switch between the two coating paths. The coating die is designed and configured for web or substrate coating, either on-roll (supported web) coating or off-roll (tension web) coating.

There are various features and benefits to the coating dies of the present invention. As indicated above, each side of the removable manifold section defines an independent fluid channel, which can include a manifold, outlet (die lip), inlet, land, pre-land, and any other die features. Each side of the manifold section operates independent of the other, in that they share no common features; that is, the resulting coating die has two inlets, two manifolds, two outlets, etc.

The two fluid channels may be the same or may be different. If the same, the removable manifold section provides a 'built-in' back-up manifold. If the fluid channels are the different, the removable manifold section eliminates the need to have two different dies for two different coating processes; by using the removable manifold section, the manifold section can easily be rotated when switching from one coating process to the other.

In use, one side of the manifold section may be used for coating while the other side is idle. In some embodiments, rather than being idle, the other side may be used to affect the coating. For example, the second side can be used to pull a vacuum on the web/coating solution, e.g., to remove air bubbles from the coating. As another example, the second side can be used as an air knife, e.g., to impinge the coated material into the substrate. As yet another example, the second side can be used as a coolant or water supply, e.g., to quench the coating. And as yet another example, the second side can be used to supply a reactive material (e.g., crosslinker) to the coating. Alternately, both sides of the manifold section may be used for simultaneously applying two coatings to result in a multi-layer coating on the substrate.

As described above, the coating die having the removable manifold section has two fluid channels, comprising two inlets, two manifolds, and two outlets (die lips), the two fluid channels being independent from one another. While the present disclosure is not so limited, an appreciation of various aspects of the disclosure will be gained through a discussion of the examples provided below.

Turning now to the figures, FIG. 1 generically illustrates a coating die of this invention, which includes a removable manifold section. The coating dies in accordance with the present disclosure are used to apply a coatable material (for example, a thermoplastic material, solvent based, or a high-solids liquid material) to a moving substrate or web.

Coating die 10 of the invention includes a first die body 12 and a second die body 14 and a removable manifold section 15 therebetween. In this embodiment, first die body 12 is an upper die body, as it is positioned above manifold section 15 and is configured for use with manifold section 15 to form a coating path and coat material. Further in this embodiment, second die body 14 is a cover attached to manifold section 15 opposite first die body 12; cover 14 is not configured for coating use, although in some embodiments it may be used for coating use. Additional discussion regarding a die body being a cover or not is below.

Figure 3:
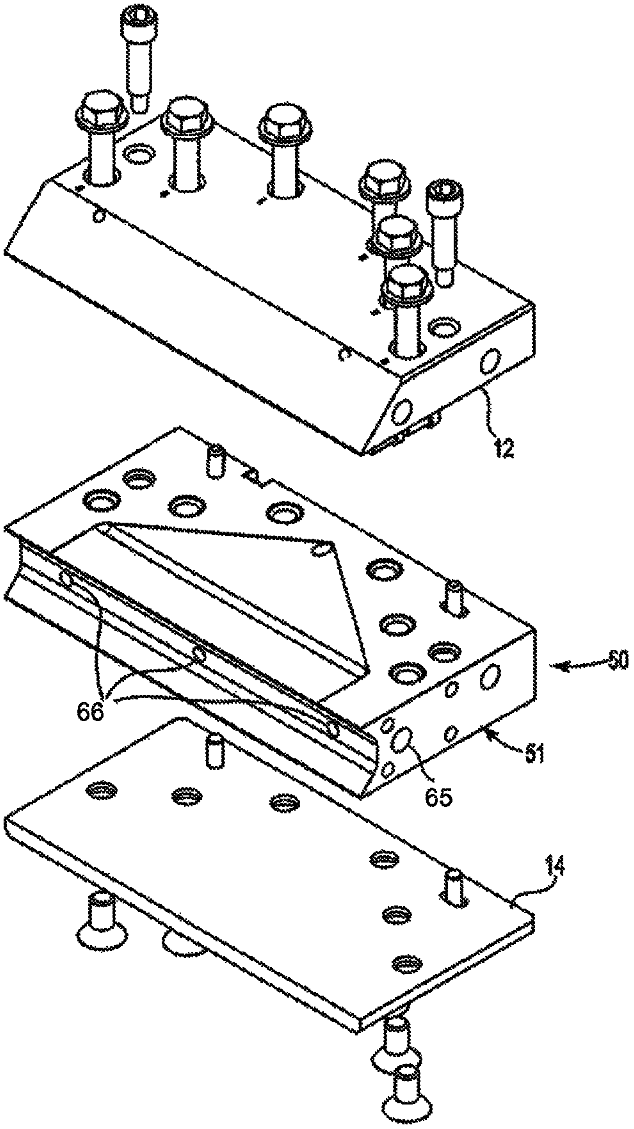
FIG. 3 is an exploded view of a coating die configured to use the manifold section of FIG. 2B in a coating application.
Figure 4:
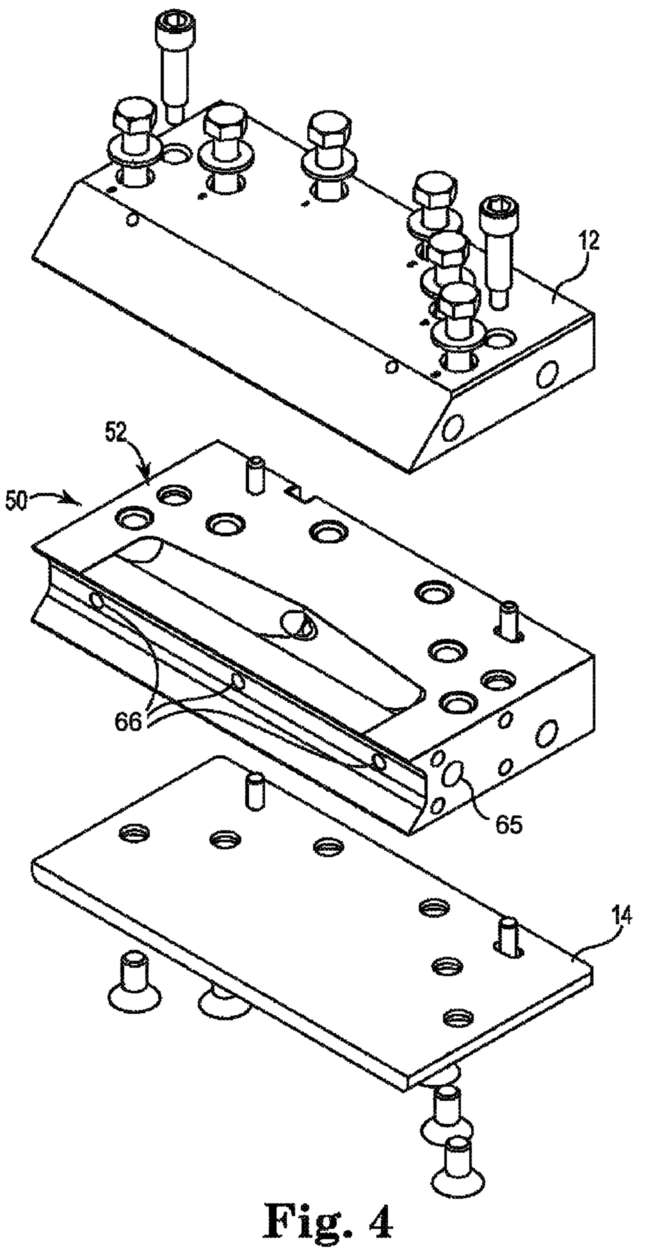
FIG. 4 is an exploded view of a coating die configured to use the manifold section of FIG. 2C in a coating application.

Present between first die body 12 and second die body 14 is manifold section 15. In FIGS. 3 and 4, the first die body 12, manifold section 15, and second die body 14 are each flat plates. Manifold section 15 is removable from between body 12 and body 14 and is flippable in orientation or is replaceable with another (e.g., different) manifold section.

Together, first die body 12 and manifold section 15 define a material path extending from an inlet 22, through fluid channel 24 and out from die 10 via outlet or lip 25. Fluid channel 24 includes a manifold downstream of inlet 22, the manifold for distributing the coatable material across the width of the die. The manifold may be any suitable type, such as a horseshoe or Winter manifold, a coat hanger manifold, a fishtail manifold, a t-manifold, etc., and does not affect the inventive features of die 10 or of manifold section 15. Downstream of the manifold may be a preland region prior to a land region that leads to outlet 25. Fluid channel 24 may include other features, such as transition areas or run-out areas. The manifold, preland and land are arranged substantially parallel to and substantially as wide as the corresponding outlet 25 to provide a uniform delivery of liquid coating material widthwise across the web or substrate being coated. The various features of inlet 22, fluid channel 24 and outlet 25 are defined by manifold section 15. That is, the manifold, preland, land, etc. are present in and at least partially defined by manifold section 15. In some embodiments, although not preferred, die body 12 may define some features of fluid channel 24, but usually die body 12 provides a flat surface against which fluid channel 24 is formed. Lands and/or outlet 25 may be adjustable in height so that the thickness of the coating applied can be adjusted as desired. The width of outlet 25 may be fixed or may be adjustable, for example, by deckling or a deckling system.

Figure 5:
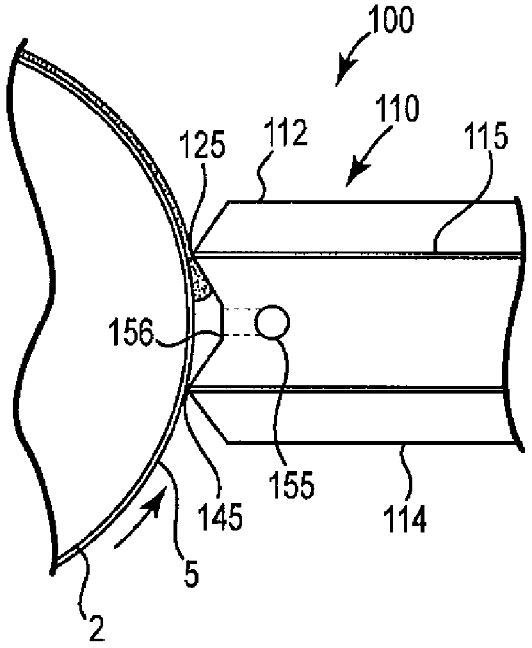
FIG. 5 is a schematic side view of a coating die of this invention being used to affect the material being coated.
Figure 6:
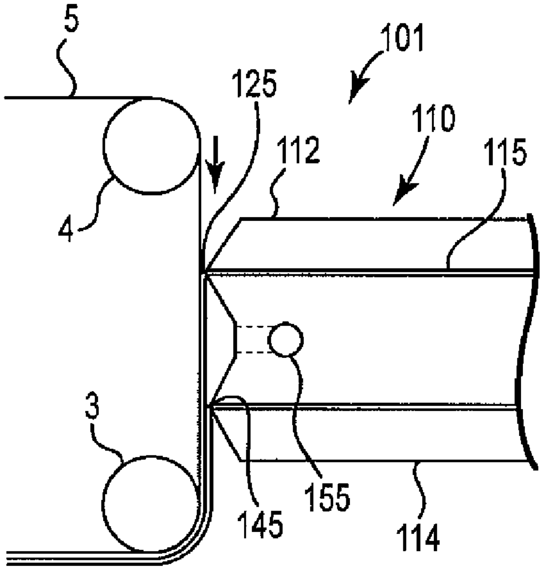
FIG. 6 is a schematic side view of a coating die of this invention being used to apply a multiple layer coating.

Similarly, second die body 14 and manifold section 15 define a possible material path extending from an inlet 42, through fluid channel 44 and out from die 10 via outlet or lip45. As shown in FIGS. 1, 5 and 6, outlet 45 is spaced apart from outlet 25. As with fluid channel 24, fluid channel 44 includes a manifold downstream of inlet 42, and an optional preland region prior to a land region that leads to outlet 45. Fluid channel 44 may include other features, such as transition areas or run-out areas. Again, the various features of inlet 42 and fluid channel 44 are defined by manifold section 15. That is, the manifold, preland, land, etc. are present in and at least partially defined by manifold section 15.

Figure 2A:
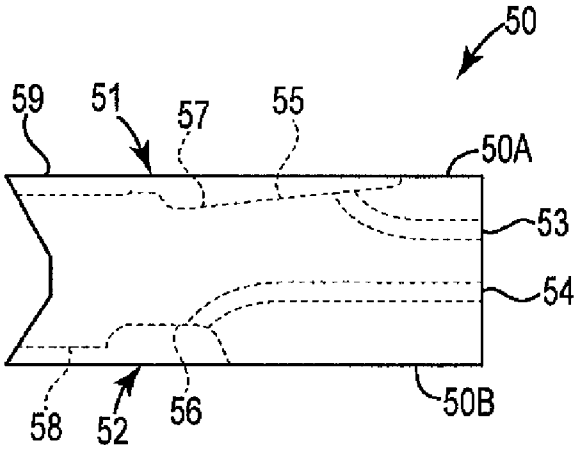
FIG. 2A is a side view of a manifold section of a coating die according to this invention.
Figure 2B:
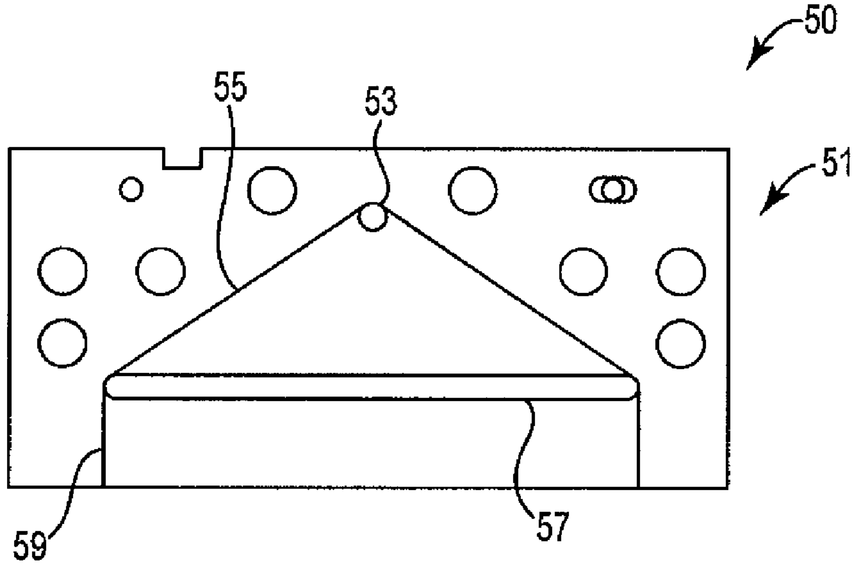
FIG. 2B is a top view of a first side of the manifold section.
Figure 2C:
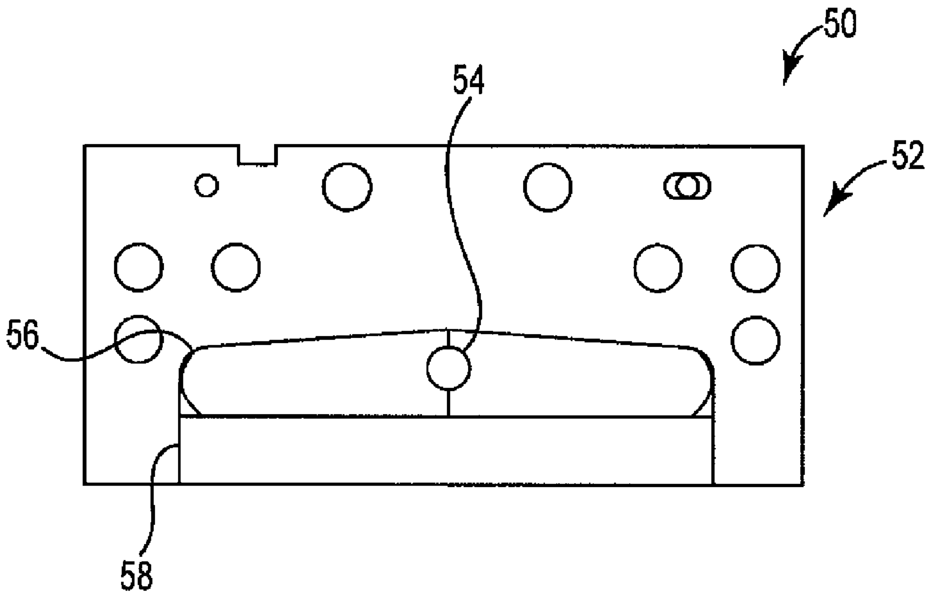
FIG. 2C is a top view of a second side of the manifold section.

Turning to FIGS. 2A-2C, a specific embodiment of a manifold section 50 according to the invention is illustrated. Manifold section 50 has a first manifold configuration 51 present on a first side 50A and a second manifold configuration 52 present on a second side 50B. As illustrated, second side 50B is parallel to first side 50A. Manifold section 50 is similar to manifold section 15 of FIG. 1 in that it is attachable to and removable from engagement between a first and second die body (e.g., die bodies 12, 14).

In this embodiment, first manifold configuration 51 is different than second manifold configuration 52. First manifold configuration 51 has a fluid channel having an inlet 53, a preland 55, a manifold 57 and a land 59. First manifold configuration 51, specifically inlet 53, preland 55, manifold 57 and land 59, are present in and at least partially defined by manifold section 50; preland 55, manifold 57 and land 59 are at least partially defined by the surface of first side 50A. Second manifold configuration 52 on the other side of manifold section 50 has a fluid channel having an inlet 54, a manifold 56 and a land 58. Second manifold configuration 52, specifically inlet 54, manifold 56 and land 58, are also present in and at least partially defined by manifold section 50, but manifold 56 and land 58 are at least partially defined by the surface of second side 50B. First and second manifold configurations 51, 52 are used for different coating processes, optionally with different coating materials.

As an example, manifold section 50 is attached to a first die body (e.g., die body 12) and a second die body (e.g., die body 14) in the orientation of FIG. 3, so that first manifold configuration 51 is adjacent first die body 12, and together first manifold configuration 51 and first die body 12 form a fluid channel for receiving coatable material therethrough. Second manifold configuration 52, in the illustrated configuration of FIG. 3, is adjacent second die body 14, which is a cover, and is idle.

At a desired time, first die body 12 and second die body 14 are removed from manifold section 50 and manifold section 50 is flipped, so that manifold section 50 is in the orientation of FIG. 4. First die body 12 and second die body 14 are then attached to manifold section 50 to form a second, different fluid channel for receiving coatable material therethrough. Having manifold section 50 with two different manifold configurations allows a coating facility to store half as many dies as compared to conventional dies, which only have one manifold configuration.

As another example, a manifold section may have two manifold configurations that are the same; that is, the same manifold configuration is present on each side of the manifold section. Having a manifold section with the same manifold configuration on each side allows a coating facility to have a back-up die on hand, in case the first one is damaged and is no longer suitable for use (e.g., outlet lip is chipped, distorted due to heat or pressure, blockage within the fluid channel, etc.).

For the previous discussion, second die body 14 has been an idle cover, rather than an active die body. A cover is used for embodiments when the manifold configuration on that side of the manifold section is idle and not used for coating. Idle covers do not need to be able to withstand the pressures and temperatures associated with coating, and thus a cover is typically less expensive, occupies less space, and is generally easier to replace if lost or damaged (e.g., dropped) as compared to a die body (e.g., die body 12) used for coating. In some embodiments, it may however be feasible to use a cover to define the fluid channel for a manifold configuration used for applying a coating.

The previous discussion has provided examples with the manifold section having two manifold configurations (either two different or two of the same configurations) where only one manifold configuration is used at a time, that is, the other one of the manifold configurations is idle. In other embodiments, both manifold configurations, i.e., both sides of the manifold section, may be used simultaneously. The second side may be used to affect the coatable material or coating being applied by the first side, or the second side may be used to also apply a coating.

A manifold configuration not used for applying a coating may be used to affect the coating that is being applied by the other side. For example, the configuration on the second side can be used to pull a vacuum on the web and/or coating solution (e.g., to remove air bubbles from the coating), as an air knife (e.g., to impinge the coated material into the substrate), as a coolant or water supply (e.g., to quench the coating), or used to supply a reactive material (e.g., crosslinker) to the coating. The ‘affecting’ side may be upstream or downstream from the coating side.

FIG. 5 illustrates a process 100 utilizing a coating die 110 having a first die body 112, a second die body 114 and a removable manifold section 115 therebetween. Coatable material to be coated passes through the flow channel between first die body 112 and manifold section 115 from a coatable material source (not illustrated), such as an extruder, to outlet 125 where the coatable material is applied to substrate 5 as a coating. Second die body 114 and manifold section 115 together form an outlet 145 which is used to affect the coating from outlet 125. In this process 100, both sides of manifold section 115 are active and both die bodies 112, 114 are active die bodies.

In process 100, the fluid channel between die body 114 and manifold section 115, which terminates at outlet 145, is used to pull a vacuum to reduce the occurrence of any air bubbles in the coating material. Depending on the amount of vacuum and its placement, the vacuum can remove a barrier of air from substrate 5 immediately prior to application of the coating material by outlet 125, or the vacuum can extract entrapped air bubbles from the coating material.

In another embodiment, a vacuum may be pulled through side aperture 155 that is in fluid communication with and leads to port 156 in the face of manifold section 115. FIGS. 3 and 4 illustrate manifold section 50 with a similar side aperture 65 in fluid communication with ports 66. Utilizing ports 66/156 to pull a vacuum provides a larger vacuum chamber than obtained if using the fluid channel between die body 114 and manifold section 115, which terminates at outlet 145.

In this configuration for FIG. 5, coating die 110 deposits coated material on substrate 5 opposite a backup roll 2. An apparatus such as that of FIG. 5, which utilizes backup roll 2 opposite coating die 110, is often referred to as "supported web" or "on-roll" coating.

Alternately, both manifold configurations may be used for coating. FIG. 6 illustrates a process 101 utilizing coating die 110 having first die body 112, second die body 114 and removable manifold section 115 therebetween. A first coatable material to be coated passes through the flow channel between first die body 112 and manifold section 115 from a coatable material source (not illustrated) to outlet 125 where the coatable material is applied to substrate 5, and a second coatable material to be coated passes through the flow channel between second die body 114 and manifold section 115 from a coatable material source (not illustrated) to outlet 145 where the coatable material is applied to substrate 5 in the form of a coating. Again in this process 101, both sides of manifold section 115 are active and both die bodies 112, 114 are active die bodies.

In process 101, a first coating is applied via outlet 125 to substrate 5, over which is applied a second coating via outlet 145. The two coatings may be the same or different, in thickness, materials, solids, etc.

In this configuration for FIG. 6, coating die 110 deposits coated material on substrate 5 between rollers 3 and 4. An apparatus such as that of FIG. 6 is often referred to as "tension web" or "off-roll" coating.

Coating processes such as illustrated in FIGS. 5 and 6 can operate at a wide range of production speeds. For example, it is not uncommon for commercial embodiments of the above arrangements to operate at rates from a few feet per minute to 2000 feet per minute to 4000 feet per minute using webs having widths of less than one foot, one meter, or more. It is understood that substrates of almost any length and/or width can be used with these coating processes. Although in most embodiments the substrate being coated is a flexible substrate such as a polymeric film, rigid substrates may also be coated with the dies and processes described herein.

The physical size of the removable manifold section is generally unlimited. The distance between the sides (e.g., side 50A and 50B of FIG. 2A) at the edge that forms the outlet or lips, and thus the distance between the two outlets, can be any desired distance, such as 1 inches, 2 inches, 3 inches, etc., and could be as little as about ½ inch. In some embodiments, a distance of as little as ¼ inch may be feasible. The width of the removable manifold is typically the same as the die bodies to which it attaches; common widths are 6 inches to 3 feet wide, although smaller and larger width dies can also be made.

Thus, various embodiments and features of the LIQUID COATING DIE are disclosed. The implementations described above and other implementations are within the scope of the following claims. One skilled in the art will appreciate that the various features described may be used in conjunction with any of the other features described herein above or other features other than those disclosed. For example, in some processes it may be desired to utilize more than one removable manifold section. Utilizing two manifold sections between two outer die bodies will provide three separate and individual fluid channels with three outlets that can be used in any arrangement to produce coating(s) or affect the coating. As another example, the previous discussion has always described two die bodies, one on each side of the removable manifold section. In some embodiments, however, an idle side of the manifold section may not require the presence of a die body.

The disclosed embodiments are presented for purposes of illustration and not limitation, and the present invention is limited only by the claims that follow.

What is claimed is:

1. A coating die comprising:

a first die body;

a second die body; and a manifold section having a first side and an opposite second side, said first and second sides of said manifold section being parallel to each other, said manifold section having first and second operable orientations, said first operable orientation having said first side of said manifold section removably connected to said first die body and said second side of said manifold section removably connected to said second die body, said second operable orientation having said first side of said manifold section removably connected to said second die body and said second side of said manifold section removably connected to said first die body, said first side of said manifold section having a first manifold configuration comprising a first inlet, first manifold, first land, and first outlet, said second side of said manifold section having a second manifold configuration comprising a second inlet, second manifold, second land, and second outlet.

2. The coating die of claim 1 wherein said first manifold configuration is same as said second manifold configuration.

3. The coating die of claim 1 wherein said first manifold configuration is different than said second manifold configuration.

4. The coating die of claim 1 wherein, when said manifold section is in said first operable orientation, said manifold section and said first die body together have a first fluid channel extending from said first inlet, through said first manifold and said first land, and out from said first outlet, and said manifold section and said second die body together have a second fluid channel extending from said second inlet, through said second manifold and said second land, and out from said second outlet.

5. The coating die of claim 4 wherein said first die body has a flat surface, and when said manifold section is in said first operable orientation said first fluid channel is formed against said flat surface of said first die body.

6. The coating die of claim 1 wherein said first manifold configuration further comprises a first preland in said first side, and wherein said first manifold, said first preland, and said first land are arranged substantially parallel to and substantially as wide as said first outlet.

7. The coating die of claim 1 wherein said first outlet has an adjustable height to produce coatings having different thicknesses.

8. The coating die of claim 1 wherein said first die body, said manifold section, and said second die body are each flat plates.

9. The coating die of claim 1 wherein said manifold section has a one-piece construction and said first and second outlets opening outwardly from said coating die are spaced apart from each other.

10. A coating die comprising:

a first die body;

a second die body; and a manifold section having a first side and an opposite second side, said manifold section having first and second operable orientations, said first operable orientation having said first side of said manifold section removably connected to said first die body and said second side of said manifold section removably connected to said second die body, said second operable orientation having said first side of said manifold section removably connected to said second die body and said second side of said manifold section removably connected to said first die body, said first side of said manifold section having a first manifold configuration comprising a first inlet, first manifold, first land, and first outlet, said second side of said manifold section having a second manifold configuration comprising a second inlet, second manifold, second land, and second outlet, said first and second outlets opening outwardly from said coating die are spaced apart from each other, wherein said first die body, said manifold section, and said second die body are each flat plates.

11. The coating die of claim 10 wherein, when said manifold section is in said first operable orientation, said manifold section and said first die body together have a first fluid channel extending from said first inlet, through said first manifold and said first land, and out from said first outlet, and said manifold section and said second die body together have a second fluid channel extending from said second inlet, through said second manifold and said second land, and out from said second outlet.

12. The coating die of claim 11 wherein said first die body has a flat surface, and when said manifold section is in said first operable orientation said first fluid channel is formed against said flat surface of said first die body.

13. The coating die of claim 10 wherein said first manifold configuration further comprises a first preland in said first side of said manifold section, and wherein said first manifold, said first preland, and said first land are arranged substantially parallel to and substantially as wide as said first outlet.

14. The coating die of claim 10 wherein said manifold section has a face located between said first outlet and said second outlet, said face having a vacuum port.

15. The coating die of claim 10 wherein said first manifold configuration is the same as said second manifold configuration.

16. The coating die of claim 10 wherein said first manifold configuration is different than said second manifold configuration.

17. The coating die of claim 10 wherein said first outlet has an adjustable height to produce coatings having different thicknesses.

18. The coating die of claim 10 wherein said manifold section has a one-piece construction.

* * * * *